US006932033B2

(12) United States Patent
Jiang

(10) Patent No.: US 6,932,033 B2
(45) Date of Patent: Aug. 23, 2005

(54) SYSTEM AND METHOD FOR IMPROVING VCT CLOSED-LOOP RESPONSE AT LOW CAM TORQUE FREQUENCY

(75) Inventor: Zhenyu Jiang, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/616,554

(22) Filed: Jul. 10, 2003

(65) Prior Publication Data

US 2005/0005883 A1 Jan. 13, 2005

(51) Int. Cl.[7] .................................................. F01L 1/34
(52) U.S. Cl. ............................... 123/90.15; 123/90.17; 74/568 R
(58) Field of Search ................ 123/90.12, 90.15–90.18; 74/568 R; 464/1, 2, 160; 92/121, 122; 73/862.331–862.335, 862.23, 862, 862.08

(56) References Cited

U.S. PATENT DOCUMENTS

| | | | |
|---|---|---|---|
| 5,002,023 A | | 3/1991 | Butterfield et al. ....... 123/90.15 |
| 5,107,804 A | | 4/1992 | Becker et al. ........... 123/90.17 |
| 5,107,805 A | | 4/1992 | Butterfield et al. ...... 123/90.17 |
| 5,172,659 A | | 12/1992 | Butterfield et al. ...... 123/90.17 |
| 5,173,651 A | * | 12/1992 | Buckley et al. ............. 318/701 |
| 5,184,578 A | | 2/1993 | Quinn, Jr. et al. ....... 123/90.17 |
| 5,289,805 A | | 3/1994 | Quinn, Jr. et al. ....... 123/90.17 |
| 5,341,675 A | * | 8/1994 | Kampf et al. ............. 73/118.1 |
| 5,361,735 A | | 11/1994 | Butterfield et al. ...... 123/90.17 |
| 5,497,738 A | | 3/1996 | Siemon et al. ........... 123/90.17 |
| 5,499,534 A | | 3/1996 | Chan ........................... 73/116 |
| 5,657,725 A | | 8/1997 | Butterfield et al. ...... 123/90.17 |
| 5,686,672 A | * | 11/1997 | Klauber et al. ........ 73/862.191 |
| 5,902,934 A | * | 5/1999 | Sprague et al. ............... 73/779 |
| 6,131,686 A | * | 10/2000 | Scotti et al. ................ 180/245 |
| 6,247,434 B1 | | 6/2001 | Simpson et al. ......... 123/90.17 |
| 6,250,265 B1 | | 6/2001 | Simpson ................... 123/90.17 |
| 6,263,846 B1 | | 7/2001 | Simpson et al. ......... 123/90.17 |
| 6,311,655 B1 | | 11/2001 | Simpson et al. ......... 123/90.17 |
| 6,374,787 B2 | | 4/2002 | Simpson et al. ......... 123/90.17 |
| 6,412,356 B1 | * | 7/2002 | Kouketsu et al. ...... 73/862.333 |
| 6,477,999 B1 | | 11/2002 | Markley .................. 123/90.17 |

FOREIGN PATENT DOCUMENTS

JP                01019146 A2   1/1989

* cited by examiner

Primary Examiner—Thomas Denion
Assistant Examiner—Jaime Corrigan
(74) Attorney, Agent, or Firm—Brown & Michaels, PC; Greg Dziegielewski

(57) ABSTRACT

Known method suitable for implementation in a computer program product for VCT closed-loop control system generally includes an integrator to eliminate the steady state error. A novel method suitable for implementation in a computer program product includes a set point filter as well to reduce the closed-loop control overshoot. Low cam torque frequency can reduce the stability of a closed-loop control system when combined with the integral action, and it can also compromise the effect of set point filter. This novel method addresses these two issues by identifying the cam torque direction and pausing control updating when there is no torque available at the desired direction.

11 Claims, 6 Drawing Sheets

SYSTEM AND METHOD FOR IMPROVING VCT CLOSED-LOOP RESPONSE AT LOW CAM TORQUE FREQUENCY

FIELD OF THE INVENTION

The invention pertains to the field of variable cam torque systems. More particularly, the invention pertains to a system and method for improving VCT closed loop response at low cam torque frequency by means of identifying cam torque direction and pausing of control updating when required.

BACKGROUND OF THE INVENTION

The performance of an internal combustion engine can be improved by the use of dual camshafts, one to operate the intake valves of the various cylinders of the engine and the other to operate the exhaust valves. Typically, one of such camshafts is driven by the crankshaft of the engine, through a sprocket and chain drive or a belt drive, and the other of such camshafts is driven by the first, through a second sprocket and chain drive or a second belt drive. Alternatively, both of the camshafts can be driven by a single crankshaft powered chain drive or belt drive. Engine performance in an engine with dual camshafts can be further improved, in terms of idle quality, fuel economy, reduced emissions or increased torque, by changing the positional relationship of one of the camshafts, usually the camshaft which operates the intake valves of the engine, relative to the other camshaft and relative to the crankshaft, to thereby vary the timing of the engine in terms of the operation of intake valves relative to its exhaust valves or in terms of the operation of its valves relative to the position of the crankshaft.

Consideration of information disclosed by the following U.S. Patents, which are all hereby incorporated by reference, is useful when exploring the background of the present invention.

U.S. Pat. No. 5,002,023 describes a VCT system within the field of the invention in which the system hydraulics includes a pair of oppositely acting hydraulic cylinders with appropriate hydraulic flow elements to selectively transfer hydraulic fluid from one of the cylinders to the other, or vice versa, to thereby advance or retard the circumferential position on of a camshaft relative to a crankshaft. The control system utilizes a control valve in which the exhaustion of hydraulic fluid from one or another of the oppositely acting cylinders is permitted by moving a spool within the valve one way or another from its centered or null position. The movement of the spool occurs in response to an increase or decrease in control hydraulic pressure, $P_C$, on one end of the spool and the relationship between the hydraulic force on such end and an oppositely direct mechanical force on the other end which results from a compression spring that acts thereon.

U.S. Pat. No. 5,107,804 describes an alternate type of VCT system within the field of the invention in which the system hydraulics include a vane having lobes within an enclosed housing which replace the oppositely acting cylinders disclosed by the aforementioned U.S. Pat. No. 5,002,023. The vane is oscillatable with respect to the housing, with appropriate hydraulic flow elements to transfer hydraulic fluid within the housing from one side of a lobe to the other, or vice versa, to thereby oscillate the vane with respect to the housing in one direction or the other, an action which is effective to advance or retard the position of the camshaft relative to the crankshaft. The control system of this VCT system is identical to that divulged in U.S. Pat. No. 5,002,023, using the same type of spool valve responding to the same type of forces acting thereon.

U.S. Pat. Nos. 5,172,659 and 5,184,578 both address the problems of the aforementioned types of VCT systems created by the attempt to balance the hydraulic force exerted against one end of the spool and the mechanical force exerted against the other end. The improved control system disclosed in both U.S. Pat. Nos. 5,172,659 and 5,184,578 utilizes hydraulic force on both ends of the spool. The hydraulic force on one end results from the directly applied hydraulic fluid from the engine oil gallery at full hydraulic pressure, $P_S$. The hydraulic force on the other end of the spool results from a hydraulic cylinder or other force multiplier which acts thereon in response to system hydraulic fluid at reduced pressure, $P_C$, from a PWM solenoid. Because the force at each of the opposed ends of the spool is hydraulic in origin, based on the same hydraulic fluid, changes in pressure or viscosity of the hydraulic fluid will be self-negating, and will not affect the centered or null position of the spool.

U.S. Pat. No. 5,289,805 provides an improved VCT method which utilizes a hydraulic PWM spool position control and an advanced control method suitable for computer implementation that yields a prescribed set point tracking behavior with a high degree of robustness.

In U.S. Pat. No. 5,361,735, a camshaft has a vane secured to an end for non-oscillating rotation. The camshaft also carries a timing belt driven pulley which can rotate with the camshaft but which is oscillatable with respect to the camshaft. The vane has opposed lobes which are received in opposed recesses, respectively, of the pulley. The camshaft tends to change in reaction to torque pulses which it experiences during its normal operation and it is permitted to advance or retard by selectively blocking or permitting the flow of engine oil from the recesses by controlling the position of a spool within a valve body of a control valve in response to a signal from an engine control unit. The spool is urged in a given direction by rotary linear motion translating means which is rotated by an electric motor, preferably of the stepper motor type.

U.S. Pat. No. 5,497,738 shows a control system which eliminates the hydraulic force on one end of a spool resulting from directly applied hydraulic fluid from the engine oil gallery at full hydraulic pressure, $P_S$, utilized by previous embodiments of the VCT system. The force on the other end of the vented spool results from an electromechanical actuator, preferably of the variable force solenoid type, which acts directly upon the vented spool in response to an electronic signal issued from an engine control unit ("ECU") which monitors various engine parameters. The ECU receives signals from sensors corresponding to camshaft and crankshaft positions and utilizes this information to calculate a relative phase angle. A closed-loop feedback system which corrects for any phase angle error is preferably employed. The use of a variable force solenoid solves the problem of sluggish dynamic response. Such a device can be designed to be as fast as the mechanical response of the spool valve, and certainly much faster than the conventional (fully hydraulic) differential pressure control system. The faster response allows the use of increased closed-loop gain, making the system less sensitive to component tolerances and operating environment.

U.S. Pat. No. 5,657,725 shows a control system which utilizes engine oil pressure for actuation. The system includes A camshaft has a vane secured to an end thereof for non-oscillating rotation therewith. The camshaft also carries a housing which can rotate with the camshaft but which is oscillatable with the camshaft. The vane has opposed lobes which are received in opposed recesses, respectively, of the housing. The recesses have greater circumferential extent than the lobes to permit the vane and housing to oscillate with respect to one another, and thereby permit the camshaft to change in phase relative to a crankshaft. The camshaft tends to change direction in reaction to engine oil pressure and/or camshaft torque pulses which it experiences during its normal operation, and it is permitted to either advance or retard by selectively blocking or permitting the flow of engine oil through the return lines from the recesses by controlling the position of a spool within a spool valve body in response to a signal indicative of an engine operating condition from an engine control unit. The spool is selectively positioned by controlling hydraulic loads on its opposed end in response to a signal from an engine control unit. The vane can be biased to an extreme position to provide a counteractive force to a unidirectionally acting frictional torque experienced by the camshaft during rotation.

U.S. Pat. No. 6,247,434 shows a multi-position variable camshaft timing system actuated by engine oil. Within the system, a hub is secured to a camshaft for rotation synchronous with the camshaft, and a housing circumscribes the hub and is rotatable with the hub and the camshaft and is further oscillatable with respect to the hub and the camshaft within a predetermined angle of rotation. Driving vanes are radially disposed within the housing and cooperate with an external surface on the hub, while driven vanes are radially disposed in the hub and cooperate with an internal surface of the housing. A locking device, reactive to oil pressure, prevents relative motion between the housing and the hub. A controlling device controls the oscillation of the housing relative to the hub.

U.S. Pat. No. 6,250,265 shows a variable valve timing system with actuator locking for internal combustion engine. The system comprising a variable camshaft timing system comprising a camshaft with a vane secured to the camshaft for rotation with the camshaft but not for oscillation with respect to the camshaft. The vane has a circumferentially extending plurality of lobes projecting radially outwardly therefrom and is surrounded by an annular housing that has a corresponding plurality of recesses each of which receives one of the lobes and has a circumferential extent greater than the circumferential extent of the lobe received therein to permit oscillation of the housing relative to the vane and the camshaft while the housing rotates with the camshaft and the vane. Oscillation of the housing relative to the vane and the camshaft is actuated by pressurized engine oil in each of the recesses on opposed sides of the lobe therein, the oil pressure in such recess being preferably derived in part from a torque pulse in the camshaft as it rotates during its operation. An annular locking plate is positioned coaxially with the camshaft and the annular housing and is moveable relative to the annular housing along a longitudinal central axis of the camshaft between a first position, where the locking plate engages the annular housing to prevent its circumferential movement relative to the vane and a second position where circumferential movement of the annular housing relative to the vane is permitted. The locking plate is biased by a spring toward its first position and is urged away from its first position toward its second position by engine oil pressure, to which it is exposed by a passage leading through the camshaft, when engine oil pressure is sufficiently high to overcome the spring biasing force, which is the only time when it is desired to change the relative positions of the annular housing and the vane. The movement of the locking plate is controlled by an engine electronic control unit either through a closed loop control system or an open loop control system.

U.S. Pat. No. 6,263,846 shows a control valve strategy for vane-type variable camshaft timing system. The strategy involves an internal combustion engine that includes a camshaft and hub secured to the camshaft for rotation therewith, where a housing circumscribes the hub and is rotatable with the hub and the camshaft, and is further oscillatable with respect to the hub and camshaft. Driving vanes are radially inwardly disposed in the housing and cooperate with the hub, while driven vanes are radially outwardly disposed in the hub to cooperate with the housing and also circumferentially alternate with the driving vanes to define circumferentially alternating advance and retard chambers. A configuration for controlling the oscillation of the housing relative to the hub includes an electronic engine control unit, and an advancing control valve that is responsive to the electronic engine control unit and that regulates engine oil pressure to and from the advance chambers. A retarding control valve responsive to the electronic engine control unit regulates engine oil pressure to and from the retard chambers. An advancing passage communicates engine oil pressure between the advancing control valve and the advance chambers, while a retarding passage communicates engine oil pressure between the retarding control valve and the retard chambers.

U.S. Pat. No. 6,311,655 shows multi-position variable cam timing system having a vane-mounted locking-piston device. An internal combustion engine having a camshaft and variable camshaft timing system, wherein a rotor is secured to the camshaft and is rotatable but non-oscillatable with respect to the camshaft is described. A housing circumscribes the rotor, is rotatable with both the rotor and the camshaft, and is further oscillatable with respect to both the rotor and the camshaft between a fully retarded position and a fully advanced position. A locking configuration prevents relative motion between the rotor and the housing, and is mounted within either the rotor or the housing, and is respectively and releasably engageable with the other of either the rotor and the housing in the fully retarded position, the fully advanced position, and in positions therebetween. The locking device includes a locking piston having keys terminating one end thereof, and serrations mounted opposite the keys on the locking piston for interlocking the rotor to the housing. A controlling configuration controls oscillation of the rotor relative to the housing.

U.S. Pat. No. 6,374,787 shows a multi-position variable camshaft timing system actuated by engine oil pressure. A hub is secured to a camshaft for rotation synchronous with the camshaft, and a housing circumscribes the hub and is rotatable with the hub and the camshaft and is further oscillatable with respect to the hub and the camshaft within a predetermined angle of rotation. Driving vanes are radially disposed within the housing and cooperate with an external surface on the hub, while driven vanes are radially disposed in the hub and cooperate with an internal surface of the housing. A locking device, reactive to oil pressure, prevents relative motion between the housing and the hub. A controlling device controls the oscillation of the housing relative to the hub.

U.S. Pat. No. 6,477,999 shows a camshaft that has a vane secured to an end thereof for non-oscillating rotation therewith. The camshaft also carries a sprocket that can rotate with the camshaft but is oscillatable with respect to the camshaft. The vane has opposed lobes that are received in opposed recesses, respectively, of the sprocket. The recesses have greater circumferential extent than the lobes to permit the vane and sprocket to oscillate with respect to one another. The camshaft phase tends to change in reaction to pulses that it experiences during its normal operation, and it is permitted to change only in a given direction, either to advance or retard, by selectively blocking or permitting the flow of pressurized hydraulic fluid, preferably engine oil, from the recesses by controlling the position of a spool within a valve body of a control valve. The sprocket has a passage extending therethrough the passage extending parallel to and being spaced from a longitudinal axis of rotation of the camshaft. A pin is slidable within the passage and is resiliently urged by a spring to a position where a free end of the pin projects beyond the passage. The vane carries a plate with a pocket, which is aligned with the passage in a predetermined sprocket to camshaft orientation. The pocket receives hydraulic fluid, and when the fluid pressure is at its normal operating level, there will be sufficient pressure within the pocket to keep the free end of the pin from entering the pocket. At low levels of hydraulic pressure, however, the free end of the pin will enter the pocket and latch the camshaft and the sprocket together in a predetermined orientation.

A Cam Torque Actuated (CTA) Variable Cam Timing (VCT) system does not move continuously in its commanded direction. To advance the VCT, a VCT controller commands a spool valve to move to open a one-way flow passage so that when the cam torque is positive (i.e. the cam torque is in the same direction as the cam rotation), the engine oil in the retard chamber is pushed out and flows into the advance chamber. When the cam torque becomes negative (i.e. the cam torque is in the opposite direction of the cam rotation), the oil flow can not reverse its direction, and the VCT is hydraulically locked. To retard the VCT, the VCT controller commands the spool valve to move in the opposite direction and the negative cam torque does the work. U.S. Pat. No. 5,107,805 is an example to the above. The resulting VCT motion is of a staircase fashion in that its position relating to the VCT system is incremented in a stepwise fashion. In other words, within one cam revolution VCT phaser moves only when the cam torque is in the right direction and then stops during the rest of cam revolution.

Generally, a method suitable for implementation in a computer program product for VCT closed-loop control system includes an integrator, which eliminates the steady state offset between VCT commanded position (set point) and measured VCT position (phase). The method suitable for implementation in a computer program product may include a set point filter as well. The set point filter is used to smooth out any abrupt change of the set point. Gradual change of the set point makes the difference between the filtered set point and the measured phase (error zero) changes gradually too. Since the control output is directly related to error zero, the overall effect of using set point filter is a smooth control output or a closed-loop control VCT system with less overshoot.

The integral action combined with a dead-time which is inherent in the cam torque actuated VCT system reduces the stability of a closed-loop control system. The dead-time is the time segment between two torque pulses, during which there is no cam torque in the right or desired direction available to drive the VCT system towards a commanded position. The lower the engine speed is and the fewer number of lobes the camshaft has, the longer this dead-time will last. On the other hand, as a general matter, the VCT controller assumes there is a constant and continuous torque available to move the VCT. The VCT controller calculates the amount of control efforts based on error zero. See U.S. Pat. No. 5,497,738 which is hereby incorporated herein by reference. As a result, the integrator keeps accumulating error zero (E0) even during the dead-time when the cam torque is in the undesirable or wrong direction and the phaser is not moving or cannot move. This in turn results in the non-stop integral action causing the controller to command more control effort than the closed-loop system needs, thus reducing the stability of the closed-loop control system. The loss of stability can be compensated by reducing the overall control gain when the cam has multiple lobes and the engine speed is high. However, the gain reduction alone is not enough when the camshaft has only few lobes, for example, less than three lobes per cam revolution, since the dead time is too long in the case of merely one or two lobes per cam revolution.

Furthermore, the effect of set point filter is compromised at low engine speed as well. In case of a set point step change, while the VCT rests in most of the cam revolution due to lack of driving torque, the filtered set point values is still growing or accumulating. When the VCT waits until the torque is in the right direction and then starts to move, error zero is already very large or has accumulated to a very large value. A large error zero generates a large control signal, which can cause excessive overshoot.

Therefore it is desirable to devise a method and system for identifying the cam torque direction and dead time; pausing control updating when there is no torque available such as during the dead time.

SUMMARY OF THE INVENTION

In a VCT system, on a cam shaft sensor wheel (cam tooth wheel) having a plurality of tooth including an index tooth which is provided to indicate when the cam torque changes its direction.

In a VCT system, on a cam shaft sensor wheel (cam tooth wheel) having a plurality of tooth including an index tooth which is provided to determine dead time.

A method is provided to identify the cam torque direction by using an extra tooth on a cam tooth-wheel.

In a VCT system, a method is provided to reduce the VCT overshoot under closed-loop control by pausing control updates when there is no torque available to drive the VCT towards its commanded position. A computer program product incorporating the method is also provided.

In a VCT system, a method is provided for identifying a direction of cam torque. The method comprising the steps of: providing a cam sensor wheel having a plurality of teeth including an index tooth formed upon the circumference of the cam sensor wheel; providing a sequence of pulses corresponding to the plurality of teeth; and using one tooth among the plurality of teeth for identifying the direction of cam torque.

DESCRIPTION OF THE PREFERRED EMBODIMENT

Figure 1:
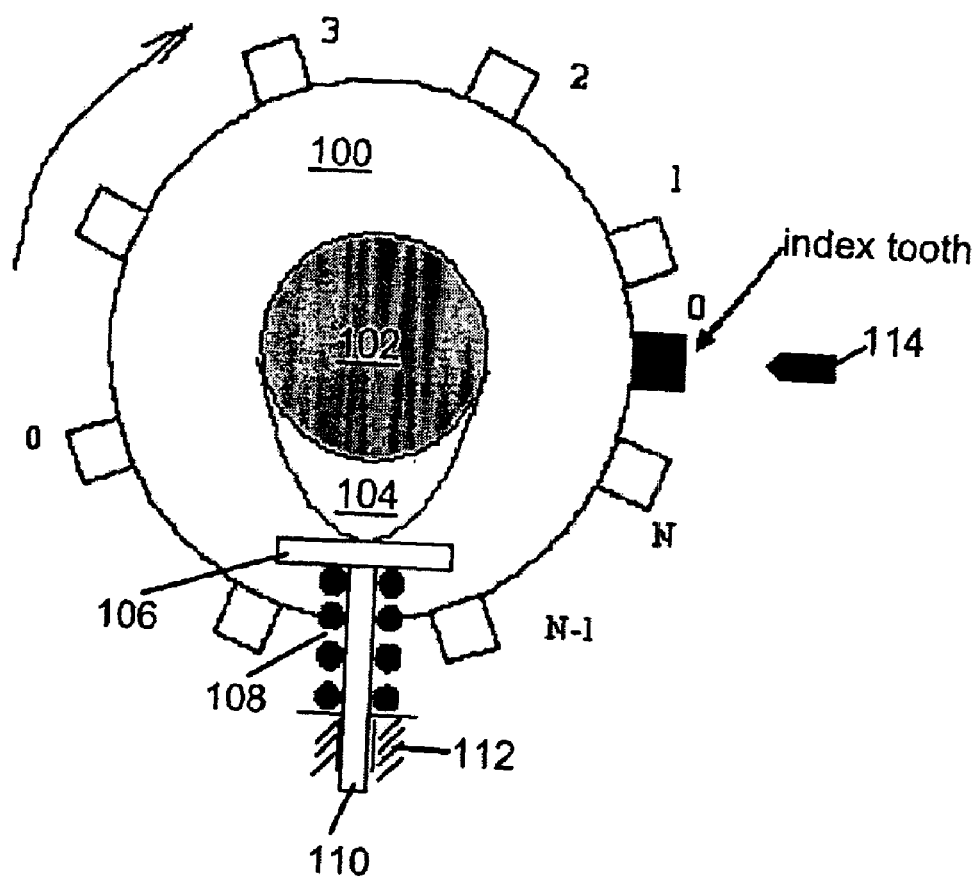
FIG. 1 shows a sensor wheel having nine (eight-plus-one) tooth and its installation on single-lobe camshaft.

FIG. 1 is a nine (eight-plus-one) tooth-wheel 100 and its installation on single-lobe camshaft. As can be seen tooth wheel 100 having eight symmetric teeth and an index tooth is provided. An additional index tooth is used in order for a cam tooth sensor to sense the same as well as all the teeth. A controller (not shown) is used to record and process the sensed tooth information.

It is noted that the all the teeth on the tooth wheel may evenly or symmetrically distributed. Or on the other hand the teeth may be asymmetrically distributed.

Tooth wheel 100 is mounted on a cam shaft 102 and rigidly affixed thereto and rotate along with the cam shaft 102. Cam shaft 102 has at least one cam lobe 104 which rotates in relation to a spring retainer 106 and exerting a force upon a surface of the spring retainer 106. A substantially equal counter force counter balances the force upon the surface by means of a valve spring 108 which is positioned upon a valve 110 in a known manner. Further, a valve guide 112 limits the movement of the valve in a known manner as well.

A cam sensor 114 which is mounted stationarily in relation to the rotating tooth wheel 100 is provided for sensing the positions of the teeth on the wheel 100.

Using the Index Tooth to Identify Cam Torque Direction

The index tooth is provided to indicate when the cam torque changes its direction. Cam torque values and its direction vary with different cam angular positions. Ideally if there is no friction torque acting on the camshaft, the camshaft experiences negative torque when cylinder valves 110 are caused to be opened at the time when each cam lobe 104 compresses its concomitant valve spring 108 respectively.

The camshaft 102 experiences positive torque during cylinder valves closing while the compressed valve springs 108 discharge their elastic kinetic energy. The zero crossing point of cam torque occurs when the angular position at which the tip of cam lobe contacts its driven part, such as the surface on the spring retainer 106. An index tooth is provided on the wheel 100 to an otherwise equally spaced tooth-wheel 100. As can be appreciated, an index pulse generated by the index tooth breaks the original uniform pulse distribution pattern. The VCT controller is then able to identify each individual tooth on the tooth-wheel. However, as pointed out supra, other original pulse distribution may be non-uniform (not shown).

The VCT controller knows the moment of torque zero crossing when the tooth-wheel is installed in such a way such that a tooth aligns with the pick up sensor when the cam lobe tip contacts its driven parts 106. The VCT controller also knows the direction of the torque because for a given tooth-wheel installation, each tooth and pick up sensor alignment associates with a fixed cam torque direction.

Referring again to FIG. 1 the installation of an eight-tooth wheel on a single-lobe camshaft is shown in which tooth zero represents torque zero crossing.

Figure 2:
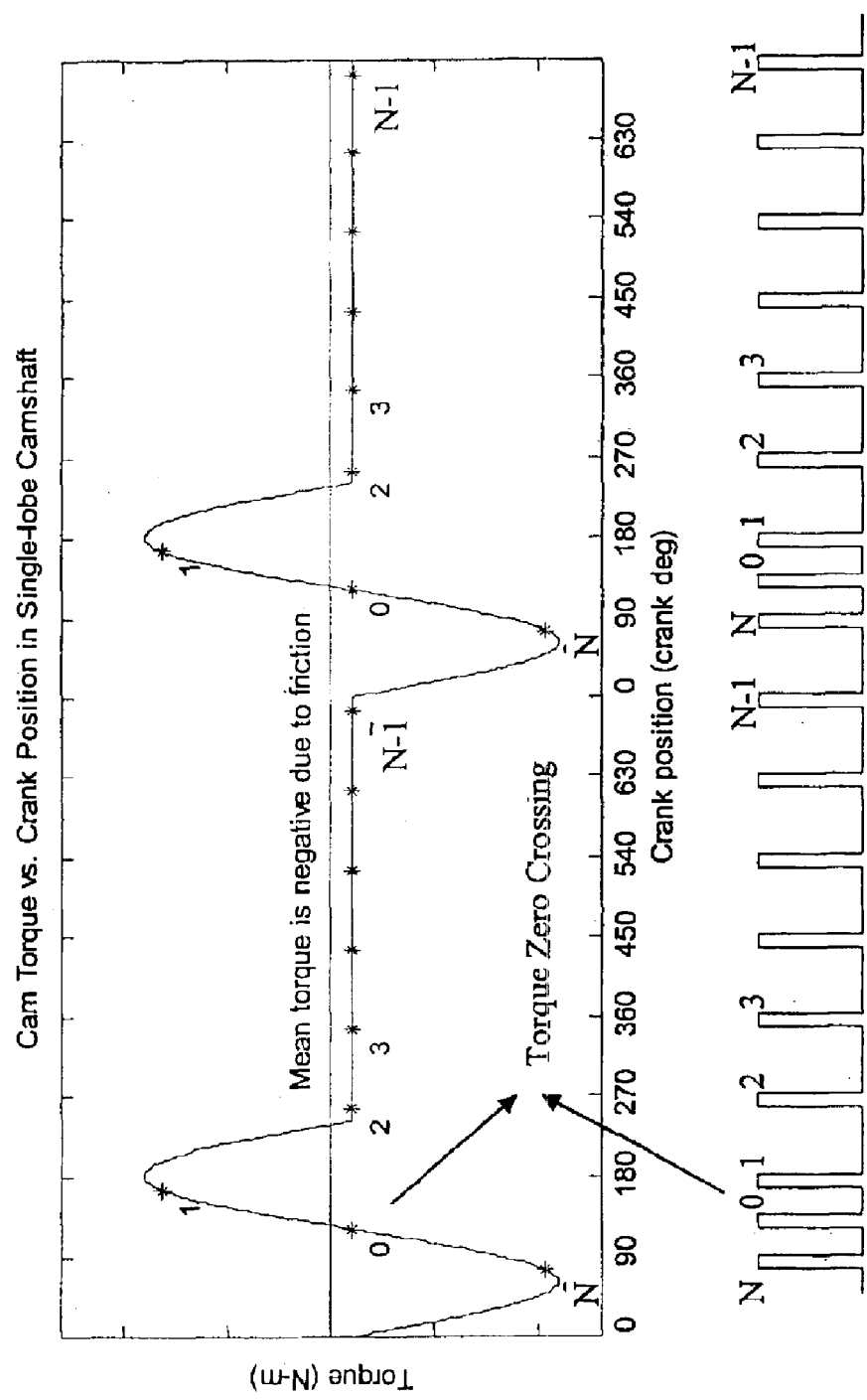
FIG. 2 shows the alignment between cam torque and tooth-wheel pulses for the present invention.

FIG. 2 shows the cam torque and the pulses generated by the pick up sensor 114 of FIG. 1. Tooth zero indicates the starting of positive torque and the ending of negative torque. Tooth 2 indicates the ending of positive torque.

In practice, the mean cam torque is always negative because of the presence of friction. Thus in the given tooth-wheel installation, tooth zero does not align precisely with the torque zero crossing point, but it is still close enough in most cases for the purpose of VCT control. By changing the alignment between tooth-wheel 100 and sensor 114, another tooth can also represent torque zero crossing. For example, if tooth N aligns with the pick-up sensor when the cam lobe 104 tip contacts its driven parts, then the detection of tooth N indicates torque zero crossing. The VCT controller is able to know the torque direction as well in that configuration.

Similarly, the VCT controller is able to identify the torque direction on any other camshaft and tooth-wheel configurations as long as an index tooth is used and the association between each tooth and the cam torque direction is known.

Variable "PulseWidth" is defined as the time difference between two consecutive tooth pulses detected by the pick up sensor 114. The following logic allows the VCT controller detects the index tooth:

If 0.25*last PulseWidth<current PulseWidth<0.75*last PulseWidth

Then the current tooth is the index tooth.

It is pointed out that fraction values 0.25 and 0.75 are picked based on the pulse width in relation to the other parameter of the pulse train. Further, the sensitively of the sensors may also be a factor in determining the fraction values. Of course the location of the index tooth in relation to other teeth is the primary factor in determining the fraction values.

Pausing Control Updating When There is no Driving Torque Available

Figure 3:
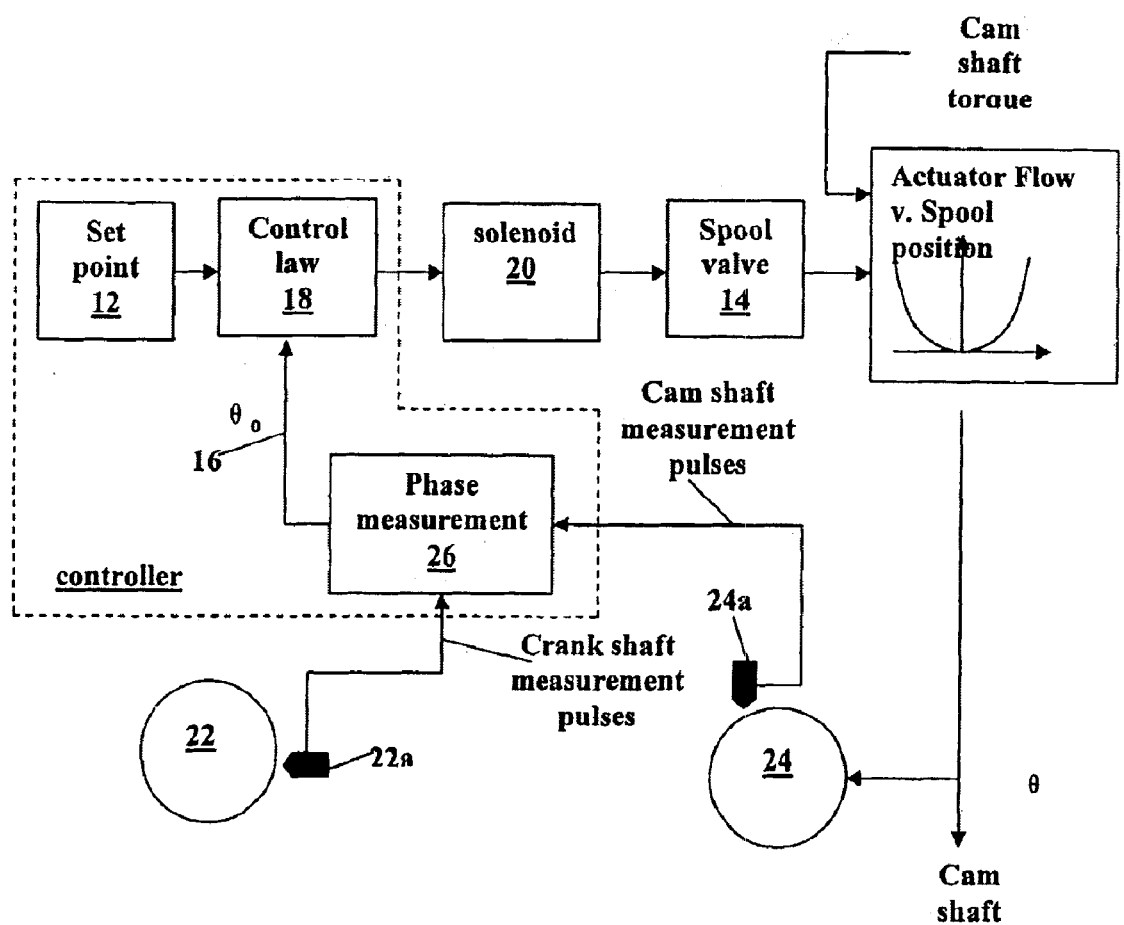
FIG. 3 shows a known (Prior Art) VCT system with closed-loop control.

FIG. 3 shows the overall VCT closed-loop control system described in U.S. Pat. No. 5,497,738. A prior art feedback loop 10 is shown. The control objective of feedback loop 10 is to have a spool valve in a null position. In other words, the objective is to have no fluid flowing between two fluid holding chambers of a phaser (not shown) such that the VCT mechanism is at the phase angle given by a set point 12 with the spool 14 stationary in its null position. This way, the VCT mechanism is at the correct phase position and the phase rate of change is zero. A control computer program product which utilizes the dynamic state of the VCT mechanism is used to accomplish the above state.

The VCT closed-loop control mechanism is achieved by measuring a camshaft phase shift $\theta_0$ 16, and comparing the same to the desired set point 12. The VCT mechanism is in turn adjusted so that the phaser achieves a position which is determined by the set point 12. A control law 18 compares the set point 12 to the phase shift $\theta_0$ 16. The compared result is used as a reference to issue commands to a solenoid 20 to position the spool 14. This positioning of spool 14 occurs when the phase error (the difference between set point 12 and phase shift 20) is non-zero.

The spool 14 is moved toward a first direction (e.g. right) if the phase error is negative (retard) and to a second direction (e.g. left) if the phase error is positive (advance). It is noted that the retarding with current phase measurement scheme gives a larger value, and advancing yields a small value. When the phase error is zero, the VCT phase equals the set point 12 so the spool 14 is held in the null position such that no fluid flows within the spool valve.

Camshaft and crankshaft measurement pulses in the VCT system are generated by camshaft and crankshaft pulse wheels 22 and 24, respectively. As the crankshaft (not shown) and camshaft (also not shown) rotate, wheels 22, 24 rotate along with them. The wheels 22, 24 possess teeth which can be sensed and measured by sensors according to measurement pulses generated by the sensors. The measurement pulses are detected by camshaft and crankshaft measurement pulse sensors 22a and 24a, respectively. The sensed pulses are used by a phase measurement device 26. A measurement phase difference is then determined. The phase between a cam shaft and a crankshaft is defined as the time from successive crank-to-cam pulses, divided by the time for an entire revolution and multiplied by 360.degree. The measured phase may be expressed as $\theta_0$ 16. This phase is then supplied to the control law 18 for reaching the desired spool position.

Figure 4:
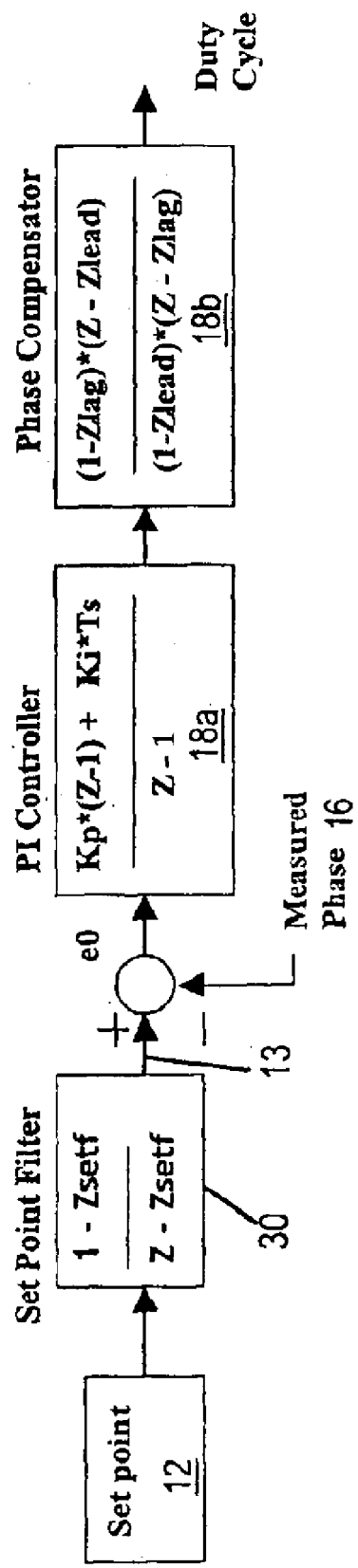
FIG. 4 shows a known (Prior Art) VCT Control Law.

A control law 18 of the closed-loop 10 is described in U.S. Pat. No. 5,184,578 and is hereby incorporate herein by reference. A more detailed depiction of the control law along with a set point filter 30 is shown in FIG. 4. Measured phase 26 is subjected to the control law 18 initially at block 18a wherein a Proportional-Integral (PI) process occurs. PI process is the sum of two sub-processes. The first sub-process includes amplification; and the second sub-process includes integration. Measured phase is further subjected to phase compensation at block 18b, where control signal is adjusted to increase the overall control system stability before it is sent out to drive the actuator, in the instant case, a variable force solenoid.

Referring to FIG. 4, a partial depiction of the known overall VCT closed-loop control system of FIG. 1 with the addition of a set point filter 30 is shown. Specifically set point filter 30 is interposed between set point 12 and control law 18. Further, control law 18 is shown in more detail for the digital implementation of the control law in FIG. 3.

Further, FIG. 4 gives the detailed implementation of the control law (block 18 in FIG. 3) in a digital control form, where the symbols are defined as follows:

Z: Next control step;
Zsetf: Parameter for the first-order set point;
Kp: Proportional control gain;
Ki: Integral control gain;
Ts: Time interval between two consecutive control steps;
Zlead: Phase compensator lead parameter;
Zlag: Phase compensator lag parameter.

Figure 5:
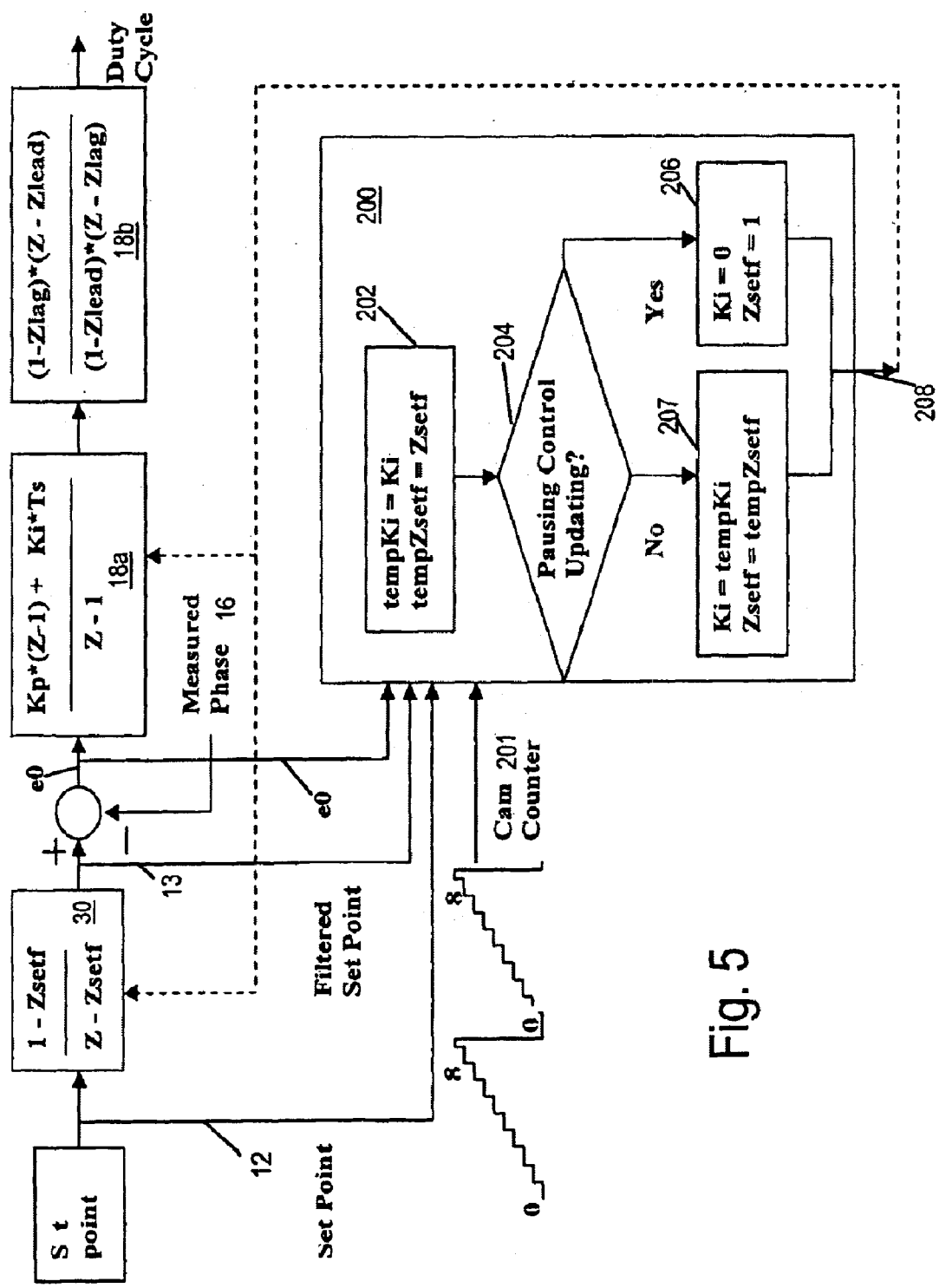
FIG. 5 shows VCT control law with pausing control updating of the present invention.

Pausing control in this invention means freezing the integral action within the PI controller and freezing the filtered set point when a) the torque is not in the right direction, and b) when the phaser is outside a small neighborhood around the VCT set point. FIG. 5 shows the logic flow.

Referring to FIG. 5, similar to FIG. 4 measured phase 26 is subjected to the control law initially at block 18a wherein a Proportional-Integral (PI) process occurs. PI process is the sum of two sub-processes. The first sub-process includes amplification; and the second sub-process includes integration. Measured phase is further subjected to phase compensation at block 18b, where control signal is adjusted to increase the overall control system stability before it is sent out to drive the actuator, in the instant case, a variable force solenoid. Furthermore, set point 12 is provided which is subject to set point filter 30 and a filtered set point 13 results.

For the present invention, in addition to the above described elements, a pausing block 200 is provided. Block 202 initializes by storing the current Integral control gain Ki to a temporary variable tempKi, and by storing Zsetf the Parameter for the first-order set point to a temporary variable tempZsetf. A determination is made at block 204 as to whether a pause in control updating is required. an example of the above determination is as follows: If the following two conditions are met, i.e. 1) the measured phase 16 is outside a predetermined neighborhood of the filtered set point 12, and 2) the VCT is retarding .AND. the cam tooth counter indicates positive torque) .OR. the VCT is advancing .AND. the cam tooth counter indicates negative torque. Then freeze the integrator and freeze the set point filter.

In other words, when the above conditions are met, Ki is set to zero and Zsetf is set to 1 as is done in block 206. The effect of block 206 rendering set point filter to non-filtering and the accumulating factor of block 18a to naught. This way, the VCT system controller does not over-accumulate error signals and filtered set point does not change when there is no torque available to move the VCT phaser towards the commanded position. The above can be indicated by the orderly accumulation of cam counter 201.

However, if it is determined not to pause the system updating, the values of Ki and Zseft are restored from the temporary variables tempKi and tempZsetf in block 207. Whether or not pausing occurs, line 208 carrying the necessary information of Ki and Zsetf is fed to block 18a and 30 respectively for correcting functions performed therein.

The implementation of the above logic for camshaft and tooth-wheel configuration shown in FIG. 1 may look as follows in computer pseudo-code.

```
tempZsetf = Zsetf       // temporarily store the value of Zsetf
tempKi = Ki             // temporarily store the value of Ki
// Conditions for pausing control updating
If (abs(e0) > threshold) AND
    (((filteredSetPoint < setPoint) AND (camCounter <=2)) OR
    ((filteredSetPoint > setPoint) AND (camCounter >=2)))
    Zsetf = 1           // freezing set point filter
    tempKi = 0          // freezing integrator
Else
    Zsetf = tempZsetf   // resume set point filter operation
    Ki = tempKi         // resume integrator operation
End
...
``` in the method suitable for implementation in a computer program product to calculate the current control output using Zsetf and Ki.

where, tempZsetf: a temporary storage variable to keep Zsetf;

tempKi: a temporary storage variable to keep Ki;

abs: math operation of absolute value;

threshold: a value to specify the range of a neighborhood, e.g., three crank degrees;

setPoint: VCT commanded position;

filteredSetPoint: the modified value of setPoint after it passes set point filter;

e0: error zero;

camCounter: a variable to count the cam tooth, its value is defined in FIG. 2.

The threshold value can be any reasonably assigned value such as 3 degree, etc.

The explanation of the "IF" conditions are as follows:

abs(e0)>threshold

The measured phase is outside the neighborhood of the filtered set point.

filteredSetPoint<setPoint

The VCT is commanded to retard if a larger phase value represents a more retarded position.

filteredSetPoint>setPoint

The VCT is commanded to advance if a smaller phase value represents a more advanced position.

camCounter<=2

The cam torque is positive. This condition may be written differently based on the association between the teeth numbers and the torque directions as long as it suggests that the torque is positive.

camCounter>=2

The cam torque is negative. This condition may be written differently based on the association between the teeth numbers and the torque directions as long as it suggests that the torque is negative.

Figure 6A:
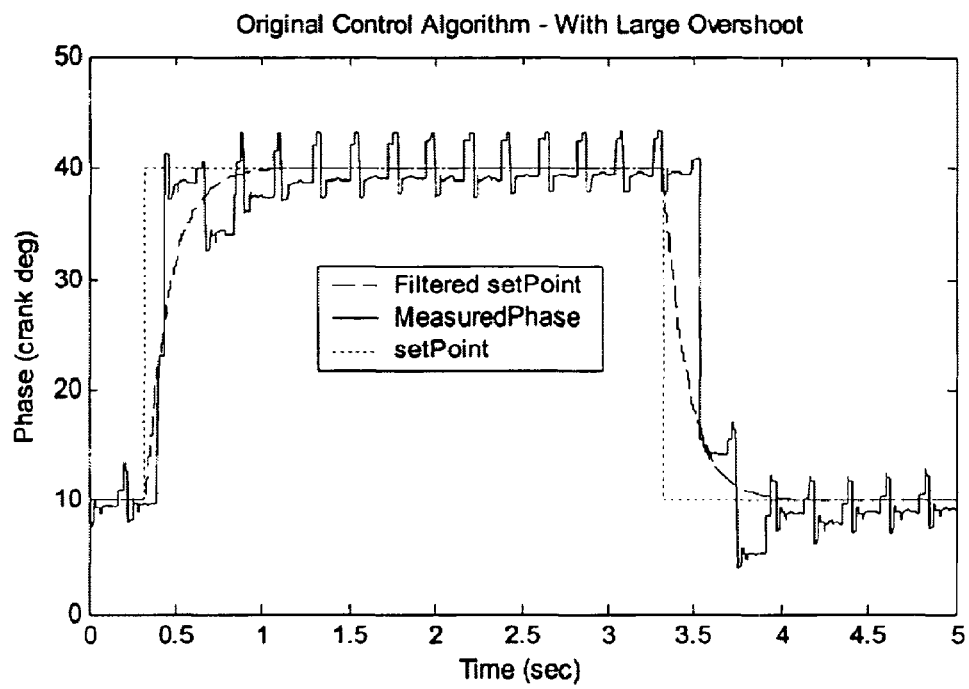
FIG. 6A shows effect of the non-improved control method.
Figure 6B:
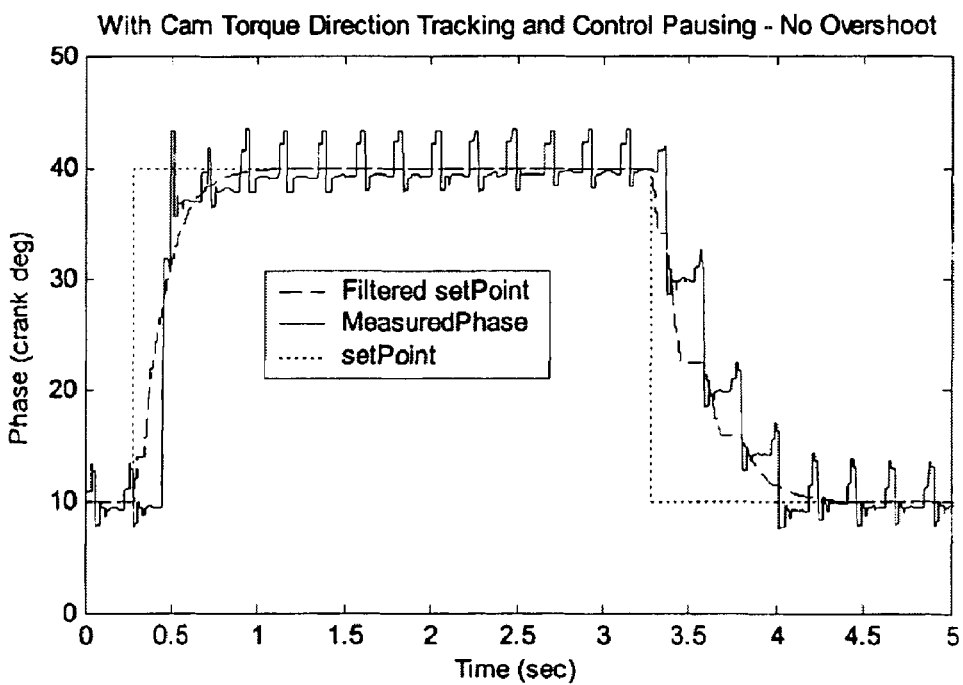
FIG. 6B shows effect of improved control method.

FIG. 6A shows the test result of the original control method suitable for implementation in a computer program product on a single-lobe camshaft VCT application. As can be seen, there is a large overshoot around the time of the $4^{th}$ second. FIG. 6B shown the test result with the implementation of the present invention. As a comparison, FIG. 6B shows no overshoot at all with the improved method suitable for implementation in a computer program product used.

One embodiment of the invention is implemented as a program product for use with a vehicle computer system such as, for example, the schematics shown in FIGS. 1 and 5 and described below. The program(s) of the program product defines functions of the embodiments (including the methods described below with reference to FIG. 5 and can be contained on a variety of signal-bearing media. Illustrative signal-bearing media include, but are not limited to: (i) information permanently stored on in-circuit programmable devices like PROM, EPPOM, etc; (ii) information permanently stored on non-writable storage media (e.g., read-only memory devices within a computer such as CD-ROM disks readable by a CD-ROM drive); (iii) alterable information stored on writable storage media (e.g., floppy disks within a diskette drive or hard-disk drive); (iv) information conveyed to a computer by a communications medium, such as through a computer or telephone network, including wireless communications, or a vehicle controller of an automobile. Some embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The following are terms and concepts relating to the present invention.

It is noted the hydraulic fluid or fluid referred to supra are actuating fluids. Actuating fluid is the fluid which moves the vanes in a vane phaser. Typically the actuating fluid includes engine oil, but could be separate hydraulic fluid. The VCT system of the present invention may be a Cam Torque Actuated (CTA)VCT system in which a VCT system that uses torque reversals in camshaft caused by the forces of opening and closing engine valves to move the vane. The control valve in a CTA system allows fluid flow from advance chamber to retard chamber, allowing vane to move, or stops flow, locking vane in position. The CTA phaser may also have oil input to make up for losses due to leakage, but does not use engine oil pressure to move phaser. Vane is a radial element actuating fluid acts upon, housed in chamber. A vane phaser is a phaser which is actuated by vanes moving in chambers.

There may be one or more camshaft per engine. The camshaft may be driven by a belt or chain or gears or another camshaft. Lobes may exist on camshaft to push on valves. In a multiple camshaft engine, most often has one shaft for exhaust valves, one shaft for intake valves. A "V" type engine usually has two camshafts (one for each bank) or four (intake and exhaust for each bank).

Chamber is defined as a space within which vane rotates. Camber may be divided into advance chamber (makes valves open sooner relative to crankshaft) and retard chamber (makes valves open later relative to crankshaft). Check valve is defined as a valve which permits fluid flow in only one direction. A closed loop is defined as a control system which changes one characteristic in response to another, then checks to see if the change was made correctly and adjusts the action to achieve the desired result (e.g. moves a valve to change phaser position in response to a command from the ECU, then checks the actual phaser position and moves valve again to correct position). Control valve is a valve which controls flow of fluid to phaser. The control valve may exist within the phaser in CTA system. Control valve may be actuated by oil pressure or solenoid. Crankshaft takes power from pistons and drives transmission and camshaft. Spool valve is defined as the control valve of spool type. Typically the spool rides in bore, connects one passage to another. Most often the spool is most often located on center axis of rotor of a phaser.

Differential Pressure Control System (DPCS) is a system for moving a spool valve, which uses actuating fluid pressure on each end of the spool. One end of the spool is larger than the other, and fluid on that end is controlled (usually by a Pulse Width Modulated (PWM) valve on the oil pressure), full supply pressure is supplied to the other end of the spool (hence differential pressure). Valve Control Unit (VCU) is a control circuitry for controlling the VCT system. Typically the VCU acts in response to commands from ECU.

Driven shaft is any shaft which receives power (in VCT, most often camshaft). Driving shaft is any shaft which supplies power (in VCT, most often crankshaft, but could drive one camshaft from another camshaft). ECU is Engine Control Unit that is the car's computer. Engine Oil is the oil used to lubricate engine, pressure can be tapped to actuate phaser through control valve.

Housing is defined as the outer part of phaser with chambers. The outside of housing can be pulley (for timing belt), sprocket (for timing chain) or gear (for timing gear). Hydraulic fluid is any special kind of oil used in hydraulic cylinders, similar to brake fluid or power steering fluid. Hydraulic fluid is not necessarily the same as engine oil. Typically the present invention uses "actuating fluid". Lock pin is disposed to lock a phaser in position. Usually lock pin is used when oil pressure is too low to hold phaser, as during engine start or shutdown.

Oil Pressure Actuated (OPA) VCT system uses a conventional phaser, where engine oil pressure is applied to one side of the vane or the other to move the vane.

Open loop is used in a control system which changes one characteristic in response to another (say, moves a valve in response to a command from the ECU) without feedback to confirm the action.

Phase is defined as the relative angular position of camshaft and crankshaft (or camshaft and another camshaft, if phaser is driven by another cam). A phaser is defined as the entire part which mounts to cam. The phaser is typically made up of rotor and housing and possibly spool valve and check valves. A piston phaser is a phaser actuated by pistons in cylinders of an internal combustion engine. Rotor is the inner part of the phaser, which is attached to a cam shaft.

Pulse-width Modulation (PWM) provides a varying force or pressure by changing the timing of on/off pulses of current or fluid pressure. Solenoid is an electrical actuator which uses electrical current flowing in coil to move a mechanical arm. Variable force solenoid (VFS) is a solenoid whose actuating force can be varied, usually by PWM of supply current. VFS is opposed to an on/off (all or nothing) solenoid.

Sprocket is a member used with chains such as engine timing chains. Timing is defined as the relationship between the time a piston reaches a defined position (usually top dead center (TDC)) and the time something else happens. For example, in VCT or VVT systems, timing usually relates to when a valve opens or closes. Ignition timing relates to when the spark plug fires.

Torsion Assist (TA) or Torque Assisted phaser is a variation on the OPA phaser, which adds a check valve in the oil supply line (i.e. a single check valve embodiment) or a check valve in the supply line to each chamber (i.e. two check valve embodiment). The check valve blocks oil pressure pulses due to torque reversals from propagating back into the oil system, and stop the vane from moving backward due to torque reversals. In the TA system, motion of the vane due to forward torque effects is permitted; hence the expression "torsion assist" is used. Graph of vane movement is step function.

VCT system includes a phaser, control valve(s), control valve actuator(s) and control circuitry. Variable Cam Timing (VCT) is a process, not a thing, that refers to controlling and/or varying the angular relationship (phase) between one or more camshafts, which drive the engine's intake and/or exhaust valves. The angular relationship also includes phase relationship between cam and the crankshafts, in which the crank shaft is connected to the pistons.

Variable Valve Timing (VVT) is any process which changes the valve timing. VVT could be associated with VCT, or could be achieved by varying the shape of the cam or the relationship of cam lobes to cam or valve actuators to cam or valves, or by individually controlling the valves themselves using electrical or hydraulic actuators. In other words, all VCT is VVT, but not all VVT is VCT.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. In a VCT system, a method for identifying a direction of cam torque, the method comprising the steps of:

providing a cam sensor wheel having a plurality of teeth including an index tooth formed upon the circumference of the cam sensor wheel;

providing a sequence of pulses corresponding to the plurality of teeth; and using one tooth among the plurality of teeth for identifying the direction of cam torque.

2. The method of claim 1 further comprising the step of using the plurality of teeth to determine a dead time.

3. The method of claim 1 further comprising the step of pausing controller updating during dead time, thereby when there is no torque available to drive the variable cam timing system (VCT) towards its commanded position, the controller stops accumulating unnecessary values.

4. The method of claim 1, wherein the plurality of teeth is symmetrically distributed upon the circumference of the cam sensor wheel.

5. The method of claim 1, wherein the plurality of teeth is asymmetrically distributed upon the circumference of the cam sensor wheel.

6. The method of claim 1, wherein the one tooth is the index tooth.

7. The method of claim 1, wherein the variable cam timing system (VCT) system is a cam torque actuated (CTA) VCT system.

8. The method of claim 1, wherein the variable cam timing system (VCT) system is a torque actuated (TA) VCT system.

9. The method of claim 1, wherein the variable cam timing system (VCT) system is an oil pressure actuated (OPA) VCT system.

10. The method of claim 1, wherein the cam tooth wheel is asymmetric.

11. The method of claim 1, wherein the cam tooth wheel is symmetric.

* * * * *